Patented Jan. 4, 1944

2,338,432

UNITED STATES PATENT OFFICE 2,338,432

LAMINATION OF WATER-SENSITIVE FILMS

George Samuel Heaven, Bridgewater, England, Herbert Stone Heaven, deceased, late of Bridgewater, England, by Zoe Heaven, administratrix, Chesham Bois, England, and Charles Robert Oswin, Bridgewater, England, assignors to E. I. du Pont de Nemours & Company, Wilmington, Del., a corporation of Delaware No Drawing. Application February 24, 1943, Serial No. 476,910. In Great Britain March 12, 1941

5 Claims. (Cl. 154—40)

This invention relates to the manufacture and production of laminated sheet materials by the lamination of water-sensitive sheets and films to sheets and films of like nature. More particularly it relates to the lamination of water-sensitive sheets or films of regenerated cellulose to sheets and films of like nature.

This application is a continuation-in-part of our copending application Serial No. 443,540 filed May 18, 1942.

Water-sensitive sheets and films are characterized in that they absorb water when they are brought into contact with water or water vapor; in so doing they tend to change their dimensions.

In the usual commercial processes of the continuous manufacture of regenerated cellulose films, the films are subjected to tension which causes internal strains in the material thereof. The view is widely held that during the process of manufacture and drying of the films, certain of these internal strains become fixed in the material of the films.

When the moisture content of commercial regenerated cellulose film is increased, under constant conditions of moderate temperature and of low tension in the film, from its normal value of about 6% (reckoned on the combined weight of cellulose and glycerin in the dried film) to a higher value, such as 10%, the dimensions of the film increase, and when the moisture content of the film of increased moisture content is decreased from its higher value to its initial value, still under the constant conditions aforesaid, the dimensions of the film likewise regain substantially their initial value. When, however, the moisture content of commercial regenerated cellulose film is increased, in the constant conditions described, from its initial value, e. g. of about 6%, beyond a certain value, hereinafter termed the "critical value" of percentage moisture content, which in normal cases is not more than about 20%, to a higher value, and is later decreased from this higher value to its initial value, the conditions of temperature and tension remaining constant, the film undergoes permanent shrinkage. The cause of this shrinkage is thought to lie in the relief of internal strains that had been fixed in the film. For a given sample of water-sensitive sheet or film, the extent of such shrinkage may vary, according to the experimental conditions, from a value just above zero up to a maximum value; for a water-sensitive sheet or film constituted by a given material such maximum shrinkage varies with the make and batch of the sheet or film, and even for different parts of sheet or film of the same batch. For commercial regenerated cellulose film, such maximum permanent shrinkage amounts to about 3.5% to 4%.

Considerable difficulty has been experienced in the past in endeavors to laminate, with the aid of an aqueous adhesive, dry regenerated cellulose sheets and films to dry sheets and films of like nature, owing to distortion, such as by buckling, curling, creasing or wrinkling, in the laminated product. It is believed that such distortion is caused by unequal permanent shrinkage of the two films from which the laminated product is formed, consequent upon the release, following the application to the films of the aqueous adhesive and absorption by the films of moisture therefrom, of internal strains in the films. As one way of overcoming this difficulty, it is known to allow the films from which the laminated product is to be formed, to undergo permanent shrinkage (prior to the application thereto of the aqueous adhesive), by wetting the films thoroughly, whereby the internal strains therein are thought to be released, but a process of lamination that includes this step requires extensive drying facilities and the exercise of great care in removing the diluted adhesive which may be exuded from the edges of the adhered wet films under the pressure used in the laminating operation. Moreover, the loss of tensile strength, which occurs on wetting regenerated cellulose films increases the difficulty of handling the film material.

An object of the present invention therefore is to provide a process for the lamination, with the aid of an aqueous adhesive, of dry water-sensitive sheets and films to dry sheets and films of like nature, whereby laminated materials are obtained which are free from distortion, such as by buckling, curling, creasing or wrinkling.

A further object resides in the provision of a process for laminating dry water-sensitive sheets and films of regenerated cellulose with the aid of aqueous adhesives, which process is featured by the fact that substantially no permanent shrinkage of the said sheets and films occurs at any stage thereof.

Other objects will appear hereinafter.

By the expression "substantially no permanent shrinkage" is to be understood a shrinkage the value of which does not exceed 0.3%. The figure of 0.3% represents a tolerance up to, but not exceeding which, laminated sheet materials, free from distortion such as by buckling, curling, creasing or wrinkling, can be obtained by the practice of the process in accordance with the invention.

These objects are realized by the process of this invention which, briefly stated, comprises coating one side of a dry water-sensitive sheet or film with a thin layer of cold aqueous adhesive and thereafter laminating the coated sheet or film to a second sheet or film which may or may not be likewise coated; the total amount of adhesive used being insufficient to raise the total moisture content of the laminated product above the critical value above defined, beyond which permanent shrinkage will occur; and the interval of time that elapses between the application of the adhesive to the sheet or film and the time the several sheets are brought together in the laminating operation being less than the "time of imbibition" hereinafter defined.

The process of the invention may advantageously be carried out in a continuous manner. In a preferred way of carrying out in a continuous manner the process of the invention for the manufacture and production of laminated sheet material, a dry, water-sensitive sheet or film, having a maximum permanent shrinkage in excess of 0.3%, is coated on one side only with a uniform and continuous thin layer of a cold aqueous adhesive, for example by passing the sheet or film over and in contact with a smooth rotating gluing roller of conventional design, e. g. of metal such as brass, the lower part of which dips into a bath of the adhesive. Any excess of the adhesive is removed from the roller by means of an adjustable doctor knife, so that the roller transfers a pre-determined amount of adhesive to the film. Alternatively the sheet or film may be coated by passing it over and in contact with a transfer roller in a known arrangement comprising a transfer roller and a fountain roller separated therefrom by a small adjustable gap, no doctor knife being necessary in this arrangement. Preferably, of the two sheets or films to be united to produce the laminated sheet material, only one is coated with adhesive, e. g. from a gluing roller, before they are brought together. Union is effected by passage through a set of rotating smooth nip-rollers under pressure. The amount of adhesive in the coating applied to the one sheet or film may be more than sufficient to raise the total moisture content of the so-coated sheet or film to and beyond the critical value, above defined, but should be insufficient to bring the total moisture content of the laminated product above the critical value. The interval of time that elapses between the application of the coating of aqueous adhesive to the one sheet or film, or to both sheets or films, and the contact of the sheets or films by passage together through the nip-rollers should be less than the "time of imbibition," determined in the way hereinafter described. The laminated material obtained is dried until the moisture content thereof has been reduced to the desired value, e. g. to about 7% (reckoned on the weight of the completely dried sheet+glycerin), preferably by passage of the laminated material in a state of moderate longitudinal tension over and in contact with rotating drying rollers, which are heated to about 60°–80° C., though the laminated material may be dried in the tension-free state if desired. In a process carried out as above described, the shrinkage of the sheets and films of the type described does not exceed 0.3% at any stage of the process, and a laminated sheet material is obtained which is free from distortion, such as by buckling, curling, creasing or wrinkling, and from optical imperfections.

When water, in the form of liquid or vapor, is brought into contact with a water-sensitive sheet or film, equilibrium in respect of water content is not reached instantaneously by the sheet or film, but only after a finite time, which is referred to in this specification as the "time of imbibition." The time of imbibition is determined, with respect to a given water-sensitive sheet or film, a given aqueous adhesive and given conditions, by the following method: A sample, several feet in length, of the sheet or film to be tested is allowed to come to equilibrium at 75° F., with respect to water content in an atmosphere having a relative humidity of 35%, and while the sheet or film is so conditioned, two marks, about 12 inches apart in the machine direction of the sheet or film, i. e. the direction in the sheet or film in which the latter passed through the machine in which it was produced, are made on the sheet or film, with the aid of water-resistant material in the form of ink, paint, or stain, and the distance between the marks, in the machine direction, is measured, the sheet or film being subjected to a tension amounting to about 2 ozs. per foot width of the sheet or film. The dry sheet or film is then coated on one side with a uniform thin layer of the adhesive, and the so-coated sheet or film is laminated to a dry sheet or film of like nature, free from adhesive, by passage together therewith through a set of rotating nip-rollers under laminating pressure. The amount of adhesive in the coating applied as a uniform thin layer to the sheet or film should be more than sufficient to raise the total moisture content of the so-coated sheet or film beyond the critical value, but insufficient to bring the value of the total moisture content of the laminated sheet material above the critical value. The laminated sheet material, after its passage through the nip-rollers, is allowed to come to equilibrium at 75° F. with respect to moisture content in an atmosphere having a relative humidity of 35%, and while the material is so conditioned and is subjected to the same tension as before, the distance between the two marks is again measured. If no substantial decrease (e. g. of the order of 0.1%) in the linear dimensions is found to have occurred between the initial and final measurements, then the interval of time that elapsed between the coating of the sheet or film with adhesive and the contact of the sheet or film, coated with adhesive, with the second sheet or film, by passage together therewith through the nip-rollers, is less than the time of imbibition. On the other hand, if a substantial contraction is observed to have taken place, then the time of imbibition has been exceeded. The test is repeated, under like conditions, with fresh supplies of film and adhesive, for a series of different measured intervals of time between the coating of the film with adhesive and the contact of the film, coated with adhesive, with the adhesive-free film, until two intervals of time, separated by a very short interval of about 0.5 second or less, are determined, in respect of one of which a contraction is observed and in respect of the other of which no substantial contraction is found to have occurred, and the arithmetic mean of the two intervals of time so characterized is taken as the time of imbibition. In the case of many water-sensitive sheets and films, including regenerated cellulose sheets and films, the time of imbibition normally amounts to not over 3 seconds.

The aqueous adhesive for employment in the process in accordance with the invention should be sufficiently fluid to spread rapidly over the sheet or film material in a continuous layer, although applied sparingly and in the cold. The adhesive should be applied cold, i. e. at a temperature below 35° C. and preferably between 15° C. and 19° C., to the water-sensitive sheet or film, and should be applied thereto sparingly in order to limit the total quantity of water presented to the sheet or film; and further, the proportion of water contained in the adhesive should be as low as is practicable. If necessary, salts or other substances may be added to the aqueous solution of the adhesive material or materials to prevent gelling. Other soluble substances, e. g. salts, may be added to increase the osmotic pressure of the aqueous adhesive with the object of thereby reducing or delaying the loss of water from the adhesive to the sheet or film.

The preferred adhesive is an aqueous solution containing gelatin and calcium chloride. In suitable adhesives of this type the proportion of water may vary within the limits of 10 to 1.5 times the proportion of air-dried gelatin, with a preferred range of 4 to 6 times; the proportion of calcium chloride should be not more than 0.9 times the proportion of air-dried gelatin, with a preferred range of 0.4 to 0.6 times, and should moreover be between 0.1 and 0.4 times, and preferably between 0.17 and 0.25 times, the proportion of water. Further, the proportion of calcium chloride should be sufficiently high to prevent gelling of the adhesive when the latter is allowed to stand for 16 hours at 18° C. Soluble substances, such as glycerin or urea, may be added to the aqueous solution containing gelatin and calcium chloride, but it is preferable that the proportion of such substances in toto, together with the proportion of calcium chloride, should not exceed the proportion of gelatin.

In the preparation of adhesives of gelatin and calcium chloride, the water is heated to about 165° F., and is then divided into two approximately equal parts, in one of which is dissolved the calcium chloride together with any other salts and soluble substances, and in the other separately the gelatin. For the gelatin, crude gelatin or light-colored hide glue may advantageously be used. If sheet gelatin or glue is used, it should be soaked overnight in a small amount of the water to be used; if powdered gelatin is employed, this preliminary soaking is unnecessary. The solutions of calcium chloride and gelatin respectively, are mixed hot, with stirring, and are then allowed to cool. A few drops of clove oil or of liquefied phenol may be added, if desired, to the adhesive as a preservative.

The following examples show, by way of illustration, the composition of adhesives suitable for employment as adhesives in the process of the invention. Parts are by weight.

Example A

| | Parts |
|---|---|
| Gelatin | 1.0 |
| Water | 6.0 |
| Calcium chloride | 0.7 |

Example B

| | Parts |
|---|---|
| Gelatin | 1.0 |
| Water | 1.7 |
| Calcium chloride | 0.4 |

Example C

| | Parts |
|---|---|
| Gelatin | 1.0 |
| Water | 3.0 |
| Calcium chloride | 0.6 |
| Urea | 0.3 |

Example D

| | Parts |
|---|---|
| Gelatin | 1.0 |
| Water | 4.0 |
| Calcium chloride | 0.6 |
| Glycerin | 0.4 |

Aqueous adhesives other than those of the gelatin-calcium chloride type may be employed, if desired, as adhesives in the process of the invention, provided that they are compounded with due regard to the requirements set forth above. In general, however, the results obtained by the employment of such other adhesives are inferior to those obtained with the gelatin-calcium chloride adhesives already described, but they may be used with advantage in special cases, or if desired in those cases where the greatest strength of joint is not essential. The following examples indicate, by way of illustration, the composition of further adhesives suitable for employment as adhesives in the process of the invention.

Example E

Aqueous gelatin solutions, containing from 15% to 30% of gelatin, in which gelling at the temperature of application of the adhesive is prevented by the addition of salts such as zinc chloride, or of acetic acid, or pyridine, or other organic solvent for the gelatin, in a proportion dependent upon the quality of the gelatin used in each particular case.

Example F

Starch paste, in which the ratio of water to starch does not exceed 2:1 (preferably 1:1) and which may contain also water-soluble salts and/or urea and/or glycerin in a proportion up to 10% reckoned on the weight of the water, to delay the imbibition of water by a water-sensitive sheet or film to which the adhesive may be applied.

Example G

Dextrin pastes, in which the ratio of water to dextrin does not exceed 2:1 (preferably 1:1).

Aqueous adhesives for employment in the process of the invention should have a substantially higher time of imbibition, compared with liquid water at the same temperature. When using adhesives of the composition set forth in Examples A to D above, and a water-sensitive commercial regenerated cellulose film sold under the Registered Trade-Mark "Cellophane," the time of imbibition, at 15°–19° C., is about 2 seconds, and is a little less than 2 seconds if the adhesive is applied to the film at temperatures higher than 20° C. Accordingly in the lamination of two such regenerated cellulose films with the aid of an aqueous adhesive of the composition set forth in any of the Examples A to D in accordance with the process of the invention, in a laminating machine of the usual type, the gluing roller and the nip-rollers of the laminating machine should be disposed at such a distance apart, having regard to the speed of travel of the film, that the film travels from the gluing roller to the nip-rollers in an interval of time less than about 2 seconds, the time of imbibition in this case.

Surface treatment, such as sizing, of water-sensitive sheets and films usually increases the time of imbibition thereof. Thus, for example, in a case in which an aqueous gelatin-calcium chloride adhesive was applied to a commercial sized regenerated cellulose film, the time of imbibition was 70% longer than that in the case in which the same adhesive was applied to a similar but unsized film under like conditions. As an example of sized films, in respect of which the time of imbibition in respect of aqueous adhesives suitable for use as adhesives in the process of the invention is longer than that in respect of similar but unsized films under like conditions, there may be mentioned films of regenerated cellulose prepared by the process described in the British Patent Specification No. 386,775.

It is often advantageous in the carrying out of the process of the invention for the manufacture and production of laminated sheet material in the form in which only one water-sensitive sheet or film is coated with adhesive by the gluing roller, that film so glued should have been subjected previously to a sizing treatment, whereby the time of imbibition thereof is increased; on the other hand, the film which remains free from adhesive until the time when it is brought into contact with the adhesively coated film first-mentioned should preferably be unsized, in order that, following contact of the adhesive-free film with the adhesively coated film in the course of the process of lamination, water may be absorbed quickly by the previously adhesive-free film from the aqueous adhesive with which the first-mentioned film is coated.

The process of the invention is further illustrated by the following examples, which however in no way limit the scope thereof.

Example 1

A dry, water-sensitive regenerated cellulose film, 11 inches in width and weighing 62 grams per square meter, which had been sized by the process described in the British Patent Specification No. 386,775, was coated on one side only with a uniform and continuous thin layer of a cold aqueous adhesive, by passing the dry film, as it was unwound from a roll thereof, continuously over and in contact with a conventional smooth rotating gluing roller, the lower part of which dipped into a bath of the adhesive, excess of adhesive being removed from the gluing roller by means of an adjustable doctor knife, so that the roller transferred a predetermined amount of adhesive to the film. An aqueous adhesive, of the following composition:

| | Parts |
|---|---|
| Gelatin | 23 |
| Calcium chloride | 14 |
| Water | 63 |
| | 100 | was thus applied, as a uniform, continuous, thin layer, to the film, in an amount equal to 60% of the weight of the film; the temperature of the adhesive at the time of application thereof to the film was 18° C. It was found by experiment, as hereinabove described, that with the materials and in the conditions described, the time of imbibition was 1.5 seconds. The film, thus coated with adhesive, was united to a previously adhesive-free, unsized, dry, water-sensitive regenerated cellulose film, also 11 inches in width and weighing 62 grams per square meter, by passage continuously together therewith through a set of rotating nip-rollers under laminating pressure amounting to 0.25 lb. per inch width of the film used. In the laminating machine, which was of the usual type comprising a gluing roller and one set of rotating nip-rollers, the distance between the axis of the gluing roller and the line of contact of the nip-rollers was 3 inches. The speed of forward travel of both films was 40 feet per minute, so that the time that elapsed between the coating of the one film with adhesive and the contact of the two films by passage together through the nip-rollers was less than 0.5 second, i. e. was less than the time of imbibition. The laminated sheet material obtained was dried by passage thereof, under moderate longitudinal tension, over a series of rotating drying rollers, heated to 70° C., until the water content of the laminated sheet material had been reduced to 7%. There was no measurable shrinkage of the films at any stage of the process described. The laminated sheet material obtained was clear and transparent, free from air-bubbles, and also free from distortion, such as by buckling, curling, creasing or wrinkling.

The method of measurement of the shrinkage of the water-sensitive sheets and films is as follows: From the roll of water-sensitive sheet or film to be tested, a length is unwound and is allowed to come to equilibrium at 75° F. with respect to moisture content in an atmosphere having a relative humidity of 35%, and while the sheet or film is so conditioned, two marks, about 12 inches apart in the machine direction of the sheet or film, i. e. the direction in the sheet or film in which the latter passed through the machine in which it was produced, are made on the sheet or film, with the aid of water-resisting material in the form of ink, paint or stain, and the distance between the marks, in the machine direction, is measured, the sheet or film being subjected to a tension amounting to about 2 ozs. per foot width of the sheet or film. The sheet or film is then rewound on the roll and is submitted to treatment in accordance with the process of the invention for the production and manufacture of laminated sheet material. At any stage that may be selected in the process, the piece of sheet or film bearing the marks is removed from the remainder thereof, and is allowed to come to equilibrium at 75° F. with respect to moisture content in an atmosphere having a relative humidity of 35%, and while the piece of sheet or film is so conditioned and is subjected to the same tension as before, the distance between the marks, in the machine direction, is again measured. The percentage decrease between the above-mentioned initial and final length-measurements represents the shrinkage of the water-sensitive sheet or film. In carrying out this method of measurement care must be taken to avoid the introduction of factors which are themselves adapted to cause irreversible shrinkage in the piece of sheet or film under test. Thus precautions are necessary in the case when the selected stage, at which the test is to be carried out, is that comprised between the steps of gluing and laminating. In such a case, the sheet or film, having left the gluing roller but having not yet reached the laminating nip-rollers, is normally coated with adhesive sufficient in amount ultimately to cause shrinkage in the sheet or film. At the point selected for test, therefore, substantially the whole of the adhesive remaining on the surface of the sheet or film is removed therefrom by wiping with an absorbent material such as cotton wool, the measurement of the shrinkage being carried out in all other respects in accordance with the method described above.

Example 2

The procedure set forth in Example 1 was followed, using however instead of the regenerated cellulose films of 62 grams per square meter the laminated sheet material obtained in the way described in Example 1 whereby one pre-laminated sheet was laminated to an identical pre-laminated sheet. The laminated sheet material so produced, was clear and transparent, free from air-bubbles and also free from distortion. There was no measurable shrinkage of the films at any stage of the process.

Example 3

The procedure set forth in Example 1 was followed, using however instead of the first-mentioned regenerated cellulose film, the laminated sheet material obtained by the process described in Example 1, the film to which it is to be laminated being, as before, an unsized, dry, water-sensitive regenerated cellulose film, 11 inches in width and weighing 62 grams per square meter. The laminated sheet material obtained, was clear and transparent, free from air-bubbles and also free from distortion. There was no measurable shrinkage of the films at any stage of the process.

Example 4

The process was carried out with materials, and in the manner and conditions, similar to those described in Example 1, except that in the place of the aqueous gelatin-calcium chloride adhesive, there was used an aqueous dextrin adhesive, in which the water-dextrin ratio was 3:2. The laminated sheet material was of excellent optical quality, free from air-bubbles and also free from distortion. There was no measurable shrinkage of the films at any stage of the process.

While for convenience the invention is above described with particular reference to regenerated cellulose sheets and films (which are water-sensitive), since it is in this respect that the invention displays its greatest advantages, it is to be understood that the invention is not so limited but is also applicable to water-sensitive sheets and films generally, including sheets and films cast from lowly substituted cellulose ethers, esters and ether-esters, such as glycol cellulose, methyl cellulose, ethyl cellulose, cellulose glycollic acid and cellulose phthalic acid, sheets and films cast from albuminous materials such as gelatin, and to sheets and films cast from other water-sensitive film-forming materials, such as alginic materials. On the other hand, highly esterified and highly etherified cellulose, for example ordinary cellulose acetate, are not regarded as water-sensitive for the purposes of this invention.

The process of the invention can be applied to the manufacture of laminated sheet material from water-sensitive sheets and films which are coated on one (adhesive-free) side with a composition comprising a cellulosic base, such as a cellulose ether or ester, a gum or a resin, a wax or the like, and preferably a plasticizer, as described in British Patent Specification No. 283,109, and water-sensitive sheets and films which are coated on one (adhesive-free) side with a continuous coating of a paint or ink such as is used in printing. The invention can also be applied to water-sensitive sheets and films, which are coated, on the side to which the adhesive will be applied, with a discontinuous coating of paint or ink, such as is used in printing. Thus, for example, regenerated cellulose sheet or film, which has been coated on one side with a moisture-resistant composition, may be printed on the previously uncoated side with a discontinuous coating, e. g. in the form of words or designs, of a paint or ink such as is used in printing, and the sheet or film so treated can then be laminated, in accordance with the process of the invention, with the aid of an aqueous adhesive, to a "plain" regenerated cellulose sheet or film (as differentiated from a sheet or film coated with a moisture-resistant coating composition), whereby there is obtained a moisture-resistant printed sheet or film in which the printing is protected from contact with other objects by the interposition of a layer of regenerated cellulose.

One or both of the water-sensitive sheets or films for employment in the process in accordance with the invention may have been dyed, pigmented, or subjected to any special known treatment, e. g. with the object of increasing fire-proofness, or imperviousness to ultra-violet light.

The principles of this invention can likewise be applied to the manufacture of laminated sheet material wherein a water-sensitive non-fibrous sheet of regenerated cellulose and a water-sensitive sheet of fibrous material such as paper, card board, Bristol board, wood veneer; cotton, linen, and regenerated cellulose textile fabrics; parchment, vellum or leather, are caused to adhere together. In general the same difficulties, arising from differences in permanent shrinkage, are encountered; and, as in the case of laminating water-sensitive non-fibrous sheets to sheets of like nature, these difficulties can be overcome by following the teachings of this invention.

Thus, a fibrous sheet may be coated with aqueous adhesive in an amount of which the water content is insufficient, when absorption of water by the fibrous sheet is taken into account, to raise the moisture content of the non-fibrous sheet above the critical value, and thereafter a non-fibrous sheet may be brought in contact with the adhesive-bearing fibrous sheet and caused to adhere thereto to form a laminated structure which will not buckle, curl or wrinkle by reason of differential permanent shrinkage. Lamination according to this invention may also be effected by coating a non-fibrous sheet with an aqueous adhesive, and then applying the same to a dry fibrous sheet with such rapidity that the fibrous sheet absorbs water from the adhesive before it has had time to penetrate the non-fibrous sheet in an amount above the critical limit.

Laminated sheet material manufactured by the process of the invention is suitable for use in cases where, for special reasons, e. g. of increased strength or rigidity, as is requisite for instance in window-pane replacement material, a sheet or film of thickness greater than that normally manufactured is desired. The process of the invention is economical and speedy.

We claim:

1. A method of laminating non-fibrous sheets or films of water-sensitive regenerated cellulose to sheets or films of like nature which comprises applying a thin layer of aqueous adhesive to one side of a dry water-sensitive regenerated cellulose film and laminating said water-sensitive film to a film of like nature within the period of imbibition for said films, the amount of said adhesive used being insufficient to bring the total moisture content of the laminated films above the critical value of percentage moisture content whereby permanent shrinkage of the films is substantially prevented during the laminating operation.

2. A method of laminating non-fibrous sheets or films of water-sensitive regenerated cellulose to sheets or films of like nature which comprises applying a thin layer of an aqueous adhesive maintained at a temperature between about 15° C. to about 19° C., to one side of a dry water-sensitive regenerated cellulose film and laminating said water-sensitive film to a film of like nature within the period of imbibition for said films, the amount of said adhesive used being insufficient to bring the total moisture content of the laminated films above the critical value of percentage moisture content whereby permanent shrinkage of the films is substantially prevented during the laminating operation.

3. A method of laminating non-fibrous sheets or films of water-sensitive regenerated cellulose to sheets or films of like nature which comprises applying a thin layer of an aqueous adhesive comprising essentially gelatin and calcium chloride to one side of a dry water-sensitive regenerated cellulose film and laminating said water-sensitive film to a film of like nature within the period of imbibition for said films, the amount of said adhesive used being insufficient to bring the total moisture content of the laminated films above the critical value of percentage moisture content whereby permanent shrinkage of the films is substantially prevented during the laminating operation.

4. A method of laminating non-fibrous sheets or films of water-sensitive regenerated cellulose to sheets or films of like nature which comprises applying a thin layer of an aqueous adhesive solution comprising essentially gelatin and calcium chloride, the proportion of water in said solution being 4 to 6 times the air-dry weight of the gelatin, and the proportion of calcium chloride being 0.4 to 0.6 times the air-dry weight of the gelatin, to one side of a dry water-sensitive regenerated cellulose film and laminating said water-sensitive film to a film of like nature within the period of imbibition for said films, the amount of said adhesive used being insufficient to bring the total moisture content of the laminated films above the critical value of percentage moisture content whereby permanent shrinkage of the films is substantially prevented during the laminating operation.

5. A method of laminating non-fibrous sheets or films of water-sensitive regenerated cellulose to sheets or films of like nature which comprises applying a thin layer of an aqueous adhesive solution comprising essentially gelatin and calcium chloride, the proportion of water in said solution being 4 to 6 times the air-dry weight of the gelatin, and the proportion of calcium chloride being 0.4 to 0.6 times the air-dry weight of the gelatin, to one side of a dry water-sensitive regenerated cellulose film and laminating said water-sensitive film to a film of like nature within the period of imbibition for said films, the amount of said adhesive used being insufficient to bring the total moisture content of the laminated film above about 20% based on the weight of the dried film.

GEORGE SAMUEL HEAVEN.
ZOE HEAVEN,
*Administratrix of the Estate of Herbert Stone Heaven, Deceased.*
CHARLES ROBERT OSWIN.